United States Patent [19]

Kasuga et al.

[11] 4,418,172

[45] Nov. 29, 1983

[54] POLYESTER COMPOSITION CONTAINING 2-METHYL-1,3-PROPYLENE GLYCOL DIBENZOATE

[75] Inventors: Takuzo Kasuga, Fuji; Yuzo Toga, Himeji; Ichiro Okamoto, Himeji; Katsuhiko Takahashi, Fuji, all of Japan

[73] Assignees: Daicel Chemical Industries, Ltd., Sakai; Polyplastics Co., Ltd., Osaka, both of Japan

[21] Appl. No.: 449,288

[22] Filed: Dec. 13, 1982

[30] Foreign Application Priority Data

Dec. 28, 1981 [JP] Japan .................................. 56-214122

[51] Int. Cl.$^3$ .......................... C08K 3/38; C08K 5/12; C08L 67/02
[52] U.S. Cl. .................................. 524/292; 524/404; 524/605
[58] Field of Search ............... 524/601, 605, 292, 404

[56] References Cited

U.S. PATENT DOCUMENTS

| | | | |
|---|---|---|---|
| 2,218,237 | 10/1940 | Gordon | 524/292 |
| 2,956,978 | 10/1960 | Reeves et al. | 524/292 |
| 3,261,800 | 7/1966 | Collins | 524/404 |
| 3,516,957 | 6/1970 | Gray et al. | 524/605 |
| 3,817,901 | 6/1974 | Schaafsma | 524/292 |
| 4,368,285 | 1/1983 | Coleman | 524/605 |

FOREIGN PATENT DOCUMENTS 1139528  1/1969  United Kingdom ............... 524/404

*Primary Examiner*—Ronald W. Griffin
*Attorney, Agent, or Firm*—Flynn, Thiel, Boutell & Tanis

[57] ABSTRACT

A polyester composition comprises polyethylene terephthalate and 0.1 to 15 wt. %, based on the polyethylene terephthalate, of 2-methyl-1,3-propylene glycol dibenzoate. It may further contain up to 40 wt. % of filler and up to 60 wt. % of a reinforcing fiber.

5 Claims, No Drawings

POLYESTER COMPOSITION CONTAINING 2-METHYL-1,3-PROPYLENE GLYCOL DIBENZOATE

The present invention relates to a polyethylene terephthalate resin composition useful as molding materials. More particularly, the invention relates to a polyethylene terephthalate resin composition containing 2-methyl-1,3-propylene glycol dibenzoate. The invention provides a new polyester composition characterized in that the resin composition molten in a mold can be crystallized rapidly in the molding step.

Polyethylene terephthalate having excellent mechanical properties, electrical properties, heat resistance and chemical resistance has been used broadly as one of the most typical synthetic fibers or for the production of industrial films or films for food packaging.

It has been known that crystallization velocity and crystallinity excert generally great influences on moldability and physical properties of crystalline polymers. In case crystalline polymers are used, it is desired that the crystallization is performed as far as possible in the molding step so as to improve the properties thereof and that the polymers are solidified rapidly in the mold to realize a high mold release condition in it to shorten the molding cycle and also to improve the productivity.

Although polyethylene terephthalate is one of the typical crystalline polymers as described above, it has a minimum crystallization temperature of as high as about 130° C. Its crystallization velocity is extremely low at a mold temperature of up to 100° C. that has been employed generally in the molding of general-purpose thermoplastic resins. Thus, polyethylene terephthalate cannot be crystallized sufficiently in an ordinary molding cycle and the release thereof from the mold becomes difficult due to an insufficient rigidity of the moldings. To overcome this defect, it is required to lower the minimum crystallization temperature of polyethylene terephthalate so as to increase the crystallization velocity and to accelerate the crystallization sufficiently even in the surface layer of the moldings. The crystallization acceleration of polyethylene terephthalate has been studied and techniques therefor have been developed in two aspects. One is modification of the basic structure of polyethylene terephthalate molecules per se. The other is blending thereof with a specific substance. Particularly, the latter process has been studied intensively. In this process, the purpose is attained by blending polyethylene terephthalate with a specific substance called a nucleating agent. As the nucleating agents, there have been known, for example, carbon powder, talc, salts of Group III metals in the Periodic Table, stearic acid, and benzoic acid salts as disclosed in the specification of Japanese Patent Publication No. 7542/1969; low-molecular compounds such as aluminum silicate hydrate as disclosed in the specification of Japanese Patent Publication No. 26222/1970; high-molecular compounds such as high-melting, highly crystalline PET as disclosed in the specifications of Japanaese Patent Publications Nos. 38622/1979 and 38623/1979; and combinations of the low-molecular compounds with the high-molecular compounds. However, these nucleating agents have only poor effects on the crystallization at a low temperature. In addition, these nucleating agents have defects in that they cause the reduction of molecular weights in the molding process, whereby physical properties of the moldings obtained are deteriorated.

After intensive investigations of processes for increasing the crystallization velocity of polyethylene terephthalate, the inventors have found that if polyethylene terephthalate is blended with 2-methyl-1,3-propylene glycol dibenzoate (hereinafter referred to as MPGDB) the crystallization velocity is increased remarkably without deteriorating the mechanical and thermophysical properties and that impact strength thereof is rather increased by this treatment. The present invention has been atttained on the basis of these findings. The present invention provides a polyester composition comprising polyethylene terephthalate or a polyester containing at least 80% of ethylene terephthalate recurring units which composition is characterized in that it further contains 0.1 to 15 wt. % of MPGDB.

The composition of the present invention has an extremely high crystallization velocity and crystallizes sufficiently to form moldings having excellent shape stability even if its residence time in a mold is short. The mechanism of the effects of MPGDB has not been elucidated yet. It is considered, however, that kinematic properties of a glycol moiety of the polyethylene terephthalate are specifically activated by said compound, whereby excellent crystallization-accelerating effects can be obtained. MPGDB has a chemical structure in which asymmetric methyl groups are positioned as side chains. It has been known that polyethylene terephthalate is blended with neopentyl glycol dibenzoate (hereinafter referred to as NPGDB) having two methyl groups arranged symmerrically as side chains as one of components of crystallization-accelerating agents (see the specification of Japanese Patent Laid-Open No. 158452/1979). However, as will be understood from examples and comparative examples given below, MPGDB according to the present invention is far superior to NPGDB with respect to mechanical and physical properties, particularly impact strength, of the composition obtained, while difference is hardly recognized between them with respect to crystallization velocity or crystallinity.

The polyethylene terephthalate resin composition of the present invention is a new polyester composition characterized in that it has a crystallization velocity increased remarkably by MPGDB contained therein and that moldings formed therefrom have a remarkably improved impact strength and they are free of deterioration of mechanical and thermophysical properties.

The polyesters used in the present invention are copolyesters containing at least 80%, preferably at least 90%, of ethylene terephthalate recurring units. As the copolymer components, there may be mentioned polybasic aliphatic carboxylic acids such as adipic acid, azelaic acid and sebacic acid; polybasic aromatic carboxylic acids such as isophthalic acid, trimellitic acid, pyromellitic acid and 2,6-naphthalenedicarboxylic acid; and polyhydric alcohols such as propylene glycol, neopentyl glycol, 1,6-hexamethylene glycol, 1,4-cyclohexanediol, cyclohexanedimethanol, trimethylolpropane and pentaerythritol. The polyethylene terephthalate and the above-mentioned copolyesters have an intrinsic viscosity determined in an o-chlorophenol solution at 25° C. of preferably at least 0.4. The above-mentioned polyesters may be incorporated with other resins in an amount within the scope of the present invention.

MPGDB to be incorporated in the composition of the present invention may be synthesized easily from 2-methyl-1,3-propanediol and benzoic acid or lower alkyl ester thereof. The amount of MPGDB to be incorporated is 0.1 to 15 wt. %, preferably 1 to 10 wt. %, based on the polyester. If the amount is less than 0.1 wt. %, the effects of MPGDB are not exhibited sufficiently and if it exceeds 15 wt. %, mechanical strengths, particularly bending strength, are deteriorated unfavorably.

If an inorganic or organic filler is incorporated in the composition of the present invention, the crystallization velocity can be increased further by the synergism thereof with MPGDB. Known inorganic and organic fillers may be used. As the inorganic fillers, there may be mentioned simple substances such as graphite and carbon black, metal nitrides such as aluminum nitride, boron nitride, silicon nitride and titanium nitride; metal oxides such as ZnO and MgO; inorganic salts such as $CaSiO_3$, $MgSiO_3$, $Pb_2(PO_4)_3$ and $BaSO_4$; and mixtures of metal oxides such as talc, kaolin and mica. As the organic fillers, there may be mentioned salts of organic acids such as calcium oxalate, magnesium stearate and polyacrylic acid salts. They may be used either alone or in the form of a mixture. The fillers are used in an amount of 0 to 40 wt. %. If they are used for the purpose of only accelerating the crystallization, a satisfactory effect can be obtained with 0.01 to 5 wt. % thereof. However, the preferred amount is 0.01 to 30 wt. % in consideration of dimensional stability and heat resistance of moldings. If the amount of the filler exceeds 40 wt. %, the moldings become brittle and the surface conditions thereof are deteriorated unfavorably.

Reinforcing fibers such as glass fiber, asbestos fiber, graphite fiber and other fibrous minerals may be incorporated in the composition of the present invention so as to improve heat resistance, rigidity and hot dimensional stability. Among them, glass fiber is particularly preferred. The amount of these reinforcing agents is 0 to 60 wt. %, preferably 5 to 50 wt. %, based on the polyester.

The total amount of the inorganic or organic filler and the reinforcing fiber incorporated in the composition of the present invention is 5 to 60 wt. % based on the polyester. If it exceeds 60 wt. %, fluidity of the composition in the molding step is reduced and the resulting moldings become brittle and have an extremely reduced tensile elongation and deteriorated surface conditions.

The composition of the invention may further contain stabilizers such as antioxidant and U.V. absorber as well as lubricant, antioxidant and flame retardant in suitable amounts depending on the use thereof.

The polyester composition of the present invention may be prepared by a mechanical method wherein the starting materials are kneaded by means of ordinary apparatuses such as rolls, Benbury mixer, extruder and molding machine. More particularly, there may be employed a process wherein the polyester is homogeneously mixed with the other components in a mixer or the like and the resulting mixture is further melt-blended in an extruder or molding machine and a wire-coating process wherein the reinforcing fiber is extruded while it is coated with the melt. It is also possible to incorporate the reinforcing fiber or inorganic or organic filler in an ester polymerization step and then to knead the resulting polymer with the other components by the above-mentioned method.

The composition obtained according to the present invention may be molded under usual molding conditions. Particularly, it crystallizes rapidly and sufficiently in a mold to form moldings having excellent thermal, mechanical and electrophysical properties. Therefore, the composition may be used broadly as molding materials for the production of various industrial parts, electrical parts and automobile parts.

The following examples will further illustrate the present invention, which by no means limit the invention. In the examples, parts are given by weight. The synthesis of MPGDB and NPGDB, kneading method, and determination of the properties of pellets obtained by the kneading by means of a differential scanning calorimeter and critical molding cycle were effected in the following manners:

(1) Synthesis of MPGDB and NPGDB:

74 parts of methyl benzoate, 24 parts of 2-methyl-1,3-propanediol and 0.37 part of tetrabutoxytitanium as catalyst were charged in a three-neck reactor provided with a condenser. The reaction was carried out at 180° C. for 4 h while methanol formed by the reaction was removed from the reaction system through the condenser. The resulting reaction product was distilled under reduced pressure to distill out 2-methyl-1,3-propanediol dibenzoate (MPGDB). Then, the product was recrystallized twice from cyclohexane. The yield was 98% based on 2-methyl-1,3-propanediol. The product was identified on the basis of infrared absorption spectrum, gas chromatography, nuclear magnetic resonance spectrum and elementary analysis. Its melting point was 39.5° to 40.2° C. NPGDB was synthesized and identified in the same manner as above except that 24 parts of 2-methyl-1,3-propanediol was replaced with 28 parts of neopentyl glycol. The melting point of NPGDB was 43.0° C.

(2) Blending and kneading:

Polyethylene terephthalate (intrinsic viscosity 0.60, melting point 254° C.) was mixed thoroughly with given amounts of other components by means of a ribbon blender. The mixture was melt-kneaded in a single screw extruder of 40 mm$\phi$ having cylinder temperature of 250°–255°–260° C. (from the hopper side) and shaped into pellets. Thus, the pellets of the respective compositions were obtained.

(3) Melting point ($T_m$), crystallization temperature ($T_c$) and heat of fusion ($\Delta H_m$):

Thermal properties of the pellets obtained in item 2 were examined by means of DSC-1B-type differential scanning calorimeter (a product of Perkin Elmer Co.). Melting point ($T_m$), refers to a peak temperature of a heat absorption curve based on the fusion observed when a sample is heated at a rate of 20° C./min. Crystallization temperature ($T_c$) refers to a peak temperature of a heat generation curve based on the crystallization observed when the melt is cooled at a rate of 20° C./min. Heat of fusion ($\Delta H_m$) was determined from an area of the above-mentioned heat absorption curve using indium as the standard.

(4) Tensile strength and elongation, impact strength and heat distortion temperature:

The pellets obtained in item 2 were dried at 135° C. for 24 h and molded into test pieces using a Toshiba Molding Machine IS-80 under conditions comprising injection velocity of 1 m/min, mold temperature of 100° C., injection time of 15 to 30 sec and cooling time of 10 sec. Blank test pieces in Tables 1 and 2 were obtained in the same manner as above except that the mold temperature and cooling time were altered to 130° C. and 5 min, respectively.

Tensile properties, impact strength and heat distortion temperature were determined according to ASTM D-638, ASTM D-256 (without notch) and ASTM D-648 (load: 18.56 kg/cm²), respectively.

(5) Critical molding cycle:

S-type test pieces for tensile impact tests according to ASTM D-1822 were formed using a Sumitomo Neomat 47/28 molding machine under molding compositions comprising cylinder temperatures of 265°–260°–220° C., mold temperature of 120° C., injection pressure of 800 kg/cm² and injection rate of 2 m/min. Injection time was fixed at 8 sec but cooling time was varied. Release properties of the test pieces from the mold were examined.

EXAMPLES 1 AND 2 AND COMPARATIVE EXAMPLES 1 AND 2

$T_m$, $T_c$, $\Delta H_m$, tensile strength and elongation, impact strength and heat distortion temperature of compositions comprising polyethylene terephthalate, glass chopped strands of 3 mm length, boron nitride having an average particle size of 3μ (Denka Boron Nitride ®; a product of Denki Kagaku Kogyo Co., Ltd.) as inorganic filler and MPGDB and NPGDB are shown in Table 1. The results of the determination of the critical molding cycle of the compositions shown in Table 1 are given in Table 2.

It is apparent from Tables 1 and 2 that a value of $T_m - T_c$ is reduced remarkably if MPGDB is used. More particularly, if MPGDB is used, velocity of solidification (corresponding to the crystallization rate) due to the change from a fused state to a crystallized state is increased and particularly, impact strength of the resulting moldings is far superior to that of moldings containing NPGDB.

TABLE 1

|  | Blank | Comp. Ex. 1 | Ex. 1 | Ex. 2 | Comp. Ex. 2 |
|---|---|---|---|---|---|
| Composition (parts) | | | | | |
| Polyethylene terephthalate | 100 | 100 | 100 | 100 | 100 |
| Glass fibers | 30 | 30 | 30 | 30 | 30 |
| Boron nitride |  | 0.05 | 0.05 | 0.05 | 0.05 |
| MPGDB |  |  | 3 | 7 |  |
| NPGDB |  |  |  |  | 3 |
| Thermal behavior | | | | | |
| $T_m$ (°C.) | 249 | 245 | 245 | 241 | 245 |
| $T_c$ (°C.) | 185 | 187 | 201 | 206 | 201 |
| $T_m-T_c$ (°C.) | 64 | 58 | 44 | 35 | 44 |
| $\Delta H_m$ (Cal/g) | 6.4 | 6.0 | 5.6 | 5.1 | 5.3 |
| Thermal and mechanical properties | | | | | |
| Tensile strength (Kg/cm²) | 1628 | 1555 | 1572 | 1520 | 1522 |
| Tensile elongation (%) | 2.2 | 2.2 | 2.2 | 2.4 | 2.2 |
| Impact strength (Kg-cm/cm) | 52 | 60 | 84 | 90 | 72 |
| Heat distortion temp. (°C.) | 230 | 230 | 223 | 220 | 224 |

TABLE 2

| Blank | | Comp. Ex. 1 | | Ex. 1 | | Comp. Ex. 2 | |
|---|---|---|---|---|---|---|---|
| Cooling time (sec) | Judgement | Cooling time (sec) | Judgement | Cooling time (sec) | Judgement | Cooling time (sec) | Judgement |
| 120 | X | 80 | X | 34 | X | 34 | X |
| 120 | X | 84 | X | 36 | X | 36 | X |
| 120 | X | 88 | X | 38 | X | 38 | X |
|  |  | 90 | X | 40 | O | 40 | X |
|  |  | 92 | X | 42 | X | 42 | O |
|  |  | 94 | X | 44 | Δ | 44 | X |
|  |  | 96 | Δ | 46 | Δ | 46 | Δ |
|  |  | 98 | O | 48 | ⊚ | 48 | O |
|  |  | 100 | ⊚ | 48 | O | 48 | O |
|  |  | 100 | ⊚ | 48 | ⊚ | 48 | ⊚ |
|  |  | 100 | ⊚ | 50 | ⊚ | 50 | ⊚ |
|  |  |  |  | 50 | ⊚ | 50 | ⊚ |

X: Non-releasable,
Δ: Distortion was significant in the injection step,
: Distortion was slight in the injection step,
: Highly releasable.

The embodiments of the invention in which an exclusive property or privilege is claimed are defined as follows:

1. A polyester composition comprising polyethylene terephthalate or a polyester containing at least 80% of ethylene terephthalate recurring units which further contains 0.1 to 15 wt. % of 2-methyl-1,3-propylene glycol dibenzoate.

2. A polyester composition comprising polyethylene terephthalate or a polyester containing at least 80% of ethylene terephthalate recurring units which further contains:
   (a) 0.1 to 15 wt. % of 2-methyl-1,3-propylene glycol dibenzoate and
   (b) up to 40 wt. % of an inorganic or organic filler.

3. A composition according to claim 2 wherein said inorganic filler is boron nitride.

4. A polyester composition comprising polyethylene terephthalate or a polyester containing at least 80% of ethylene terephthalate recurring units which further contains:
   (a) 0.1 to 15 wt. % of 2-methyl-1,3-propylene glycol dibenzoate,
   (b) up to 40 wt. % of an inorganic or organic filler and
   (c) up to 60 wt. % of a reinforcing fiber.

5. A composition according to claim 4 wherein said reinforcing fiber is glass fiber.

* * * * *